(No Model.)

F. L. WHARTENBY.
VEHICLE SPRING.

No. 312,778.                      Patented Feb. 24, 1885.

WITNESSES

Frank L. Whartenby.
INVENTOR

Attorneys

UNITED STATES PATENT OFFICE.

FRANK LESLIE WHARTENBY, OF HOPEWELL, OHIO.

VEHICLE-SPRING.

SPECIFICATION forming part of Letters Patent No. 312,778, dated February 24, 1885.

Application filed October 10, 1884. (No model.)

*To all whom it may concern:*

Be it known that I, FRANK L. WHARTENBY, a citizen of the United States, residing at Hopewell, in the county of Muskingum and State of Ohio, have invented a new and useful Improvement in Side Springs, of which the following is a specification, reference being had to the accompanying drawings.

My invention relates to vehicle-springs; and it has for its object to provide devices of this character whereby all side motion of the vehicle-body will be prevented.

A further object of the invention is to provide a side spring which shall be cheap and simple in its construction, effective in its operation, and one that will be strong and durable.

With the above and other objects in view the invention consists in the improved construction and detailed arrangement of parts, hereinafter fully described, and pointed out in the claims.

Figure 1:
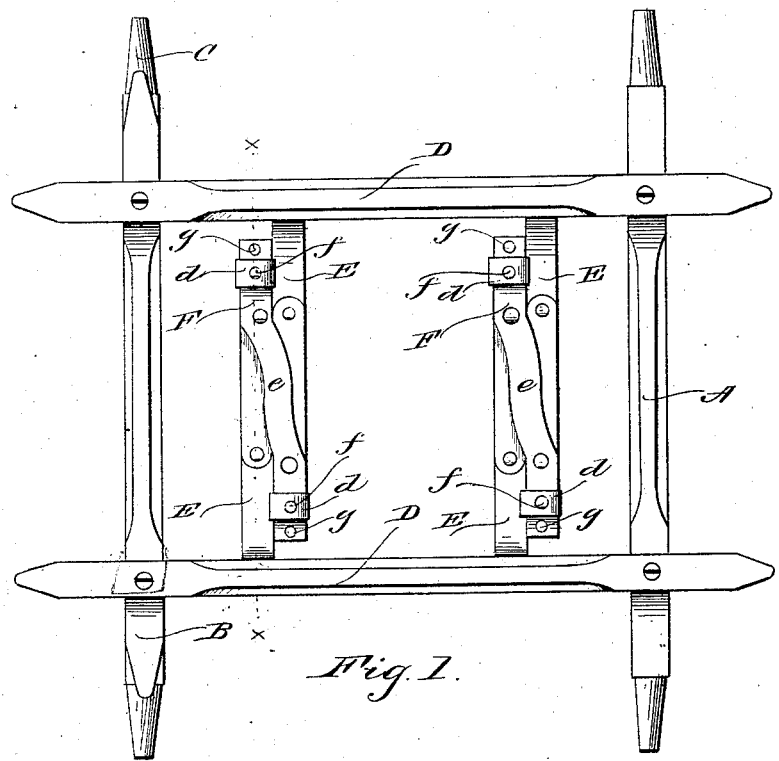
Figure 2:
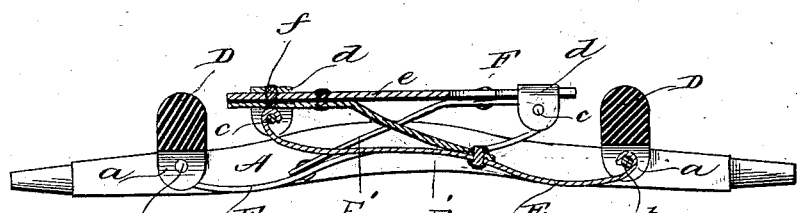

In the drawings, Figure 1 is a plan view of the running-gear of a vehicle, the body being removed. Fig. 2 is a transverse section on the line $x$ $x$ of Fig 1.

In the accompanying drawings, in which like letters of reference indicate corresponding parts in both the figures, A represents the rear axle; B, the bolster; C, the forward axle, pivoted to the under side thereof, and D the side-bars connecting the rear axle and bolster, as shown. Upon the under sides of the side-bars, near the ends thereof, between the rear axle and bolster, are provided downwardly-extending brackets $a$. In these brackets are pivoted, by means of transverse bolts $b$, leaves E, which are formed with a compound curve, and are provided at their ends with eyes for the passage of the said bolts $b$. The ends of the leaves E extend upwardly and cross each other, their upper ends being flush with the side-bars D. The upper ends of these leaves are formed with eyes for the passage of bolts $c$ of clips $d$.

Secured to and connecting the upper ends of the leaves E is a bar or plate, F, the ends of which extend in opposite directions from the body portion $e$, the ends of said bars or plates fitting between the clips.

F' represents plates, the upper ends of which fit between the upper ends of the leaves and the bar or plate F, and are secured to said plate by means of bolts $f$. Their other or lower ends are secured to the leaves E, and thus form a brace for the same. The ends of the bars F and the plates or strips F' extend outside of and beyond the clips $d$, and are provided with registering holes or openings $g$ for the passages of bolts for securing the wagon-body in position.

It will be observed that as the plates F' are secured to the under side of the bars F they form a seat for the same, and serve as a support and brace, and thus prevent undue flexion of the leaves composing the spring.

By the employment of the springs above described all side motion of the vehicle-body is prevented, and by their use a vehicle-body may be readily adjusted in position. Further, a spring constructed as above described is simple, may be manufactured and supplied at a slight cost, its operation is thoroughly effective, and it is strong and durable.

Having fully described my invention, what I claim as new, and desire to secure by Letters Patent, is—

1. The combination, with the side-bars of a vehicle, of leaf-springs connected at their upper ends by a bar, and bracing-plates connecting the ends of said bar with the leaf-springs, as set forth.

2. The combination, with the side-bars of a vehicle, having brackets secured to their under sides, of leaf-springs hinged therein at their lower ends, a bar connecting the other ends of said leaf springs by a hinge joint, and bracing-plates secured to the leaf-springs and to the ends of the said bar, as set forth.

3. The herein-described vehicle-spring, consisting of the leaf-springs having a compound curve, bracing-plates connected with said leaf-springs, and a bar rigidly connected with the bracing-plates and hinged to the leaf-springs by clips, substantially as set forth.

In testimony that I claim the foregoing as my own I have hereto affixed my signature in presence of two witnesses.

FRANK LESLIE WHARTENBY.

Witnesses:
 JOS. HOMER RICHEY,
 GEO. H. HOOD.